United States Patent
Choi et al.

(10) Patent No.: US 10,635,247 B2
(45) Date of Patent: Apr. 28, 2020

(54) TOUCH SENSOR

(71) Applicant: DONGWOO FINE-CHEM CO., LTD., Jeollabuk-do (KR)

(72) Inventors: Byung Jin Choi, Gyeonggi-do (KR); Jae Hyun Lee, Gyeonggi-do (KR); Cheol Hun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 57 days.

(21) Appl. No.: 15/716,691

(22) Filed: Sep. 27, 2017

(65) Prior Publication Data
US 2018/0032177 A1 Feb. 1, 2018

Related U.S. Application Data

(63) Continuation of application No. PCT/KR2016/001528, filed on Feb. 16, 2016.

(30) Foreign Application Priority Data

Mar. 30, 2015 (KR) .................. 10-2015-0044294

(51) Int. Cl.
G06F 3/044 (2006.01)
(52) U.S. Cl.
CPC .... G06F 3/044 (2013.01); *G06F 2203/04111* (2013.01); *G06F 2203/04112* (2013.01)
(58) Field of Classification Search
CPC .......... G06F 3/044; G06F 3/041; G06F 3/0416
See application file for complete search history.

(56) References Cited

U.S. PATENT DOCUMENTS

| 2012/0031746 | A1  | 2/2012 | Hwang et al. |
| 2012/0081300 | A1* | 4/2012 | Chan ............... G06F 3/044 345/173 |
| 2014/0111709 | A1* | 4/2014 | Kim .............. G02F 1/13338 349/12 |
| 2014/0152921 | A1* | 6/2014 | Yashiro ............ G06F 3/044 349/12 |
| 2014/0210766 | A1  | 7/2014 | Kang et al. |

(Continued)

FOREIGN PATENT DOCUMENTS

| CN | 103472951 A | 12/2013 |
| CN | 204044792 U | 12/2014 |

(Continued)

OTHER PUBLICATIONS

International Search Report for PCT/KR2016/001528.

(Continued)

*Primary Examiner* — Sepehr Azari
(74) *Attorney, Agent, or Firm* — The PL Law Group, PLLC (57) ABSTRACT

A touch sensor includes a sensing pattern which include a first mesh pattern formed in a first direction and a second mesh pattern formed in a second direction, the second mesh pattern including isolated unit patterns, a bridge electrode connecting the neighboring unit patterns of the second mesh pattern, an insulation layer disposed between the sensing pattern and the bridge electrode, and an auxiliary electrode layer on an at least one of the first mesh pattern and the second mesh pattern, the auxiliary electrode layer being connected to at least one of the first mesh pattern and the second mesh pattern.

11 Claims, 4 Drawing Sheets

(56) References Cited

U.S. PATENT DOCUMENTS

| | | | |
|---|---|---|---|
| 2014/0238730 A1* | 8/2014 | Nakamura | B32B 15/14 174/253 |
| 2016/0041647 A1* | 2/2016 | Bae | G06F 3/044 345/174 |
| 2016/0202827 A1* | 7/2016 | Bae | G06F 3/044 345/174 |
| 2016/0246405 A1* | 8/2016 | Hu | G06F 3/044 |
| 2017/0108964 A1* | 4/2017 | Sato | G06F 3/044 |
| 2018/0018034 A1* | 1/2018 | Choi | G06F 3/041 |

FOREIGN PATENT DOCUMENTS

| | | |
|---|---|---|
| CN | 104281351 A | 1/2015 |
| CN | 104423667 A | 3/2015 |
| JP | 2011-175967 A | 9/2011 |
| TW | 201343389 A | 11/2013 |
| TW | M476996 U | 4/2014 |
| TW | M494356 U | 1/2015 |
| WO | WO 2014/098406 A1 | 6/2014 |
| WO | WO 2015/016510 A1 | 2/2015 |
| WO | WO 2015/026071 A1 | 2/2015 |

OTHER PUBLICATIONS

Office action dated Sep. 4, 2019 from China Patent Office in a counterpart China Patent Application No. 201680019336.X (English translation is also submitted herewith.).

\* cited by examiner

TOUCH SENSOR

CROSS-REFERENCE TO RELATED APPLICATION AND CLAIM OF PRIORITY

This application claims is a continuation application to International Application No. PCT/KR2016/001528, filed Feb. 16, 2016 which claims priority to Korean Patent Applications No. 10-2015-0044294 filed on Mar. 30, 2015 in the Korean Intellectual Property Office (KIPO), the entire disclosure of which is incorporated by reference herein.

BACKGROUND

1. Field

The present invention relates to a touch sensor.

2. Description of the Related Art

As a computer using digital techniques has been developed, auxiliary devices of a computer are also being developed together. Personal computers, portable transmission devices, other private information processing devices, etc., perform text and graphic processing using a variety of input devices such as a keyboard and a mouse.

Recently, as transition into an information-oriented society is rapidly progressing, an application of the computer is gradually enlarged. However, there is a difficulty to efficiently drive computer-related products by using only a keyboard and a mouse, which currently serve as the input device. Therefore, a demand for a device capable of simply operating with reduced malfunction, and easily inputting information by anyone becomes higher.

Further, interests in the technique relating to the input device turn into high reliability, durability, innovativeness, design and processing-related techniques, or the like, beyond the level of satisfying general functions. For the purpose of achieving the interests, a touch sensor has been developed as an input device capable of inputting information such as texts, and graphics, etc.

The above-described touch sensor is a device which is installed on a display surface of an electronic notepad, a flat panel display device such as a liquid crystal display (LCD) device, a plasma display panel (PDP) or electroluminescence (EL) device, or an image display device such as a cathode ray tube (CRT), and is used to allow a user so as to select and input required information while viewing an image displayed on the image display device.

Types of the touch sensor are divided into a resistive type, a capacitive type, an electro-magnetic type, a surface acoustic wave (SAW) type, and an infrared type depending on a driving method thereof. Such various types of the touch sensor are employed in electronic products in consideration of a signal amplification, a difference in resolution, a difficulty in design and processing techniques, optical properties, electrical properties, mechanical properties, environment-resistant characteristics, input characteristics, durability and economic feasibility. Currently, the resistive type touch sensor and the capacitive-type touch sensor are widely used.

Meanwhile, research to form electrode pattern using a metal in a touch sensor as disclosed in Japanese Patent Laid-Open Publication No. 2011-175967, have been actively conducted. When forming the metal electrode pattern, there is a problem that the electrode pattern can be seen to the user, although the electrical conductivity can be improved. Additionally, a precise process is required to form a thin electrode pattern, and touch sensitivity may be decreased because of a fracture or a disconnection of some electrode patterns.

SUMMARY

According to an aspect of the present invention, there is provided a touch sensor with improved touch sensitivity.

According to an aspect of the present invention, there is provided a touch sensor with improved optical and bending properties.

The above aspects of the present inventive concepts will be achieved by the following features or characteristics:

(1) A touch sensor comprising: sensing patterns which include first mesh patterns formed in a first direction and second mesh patterns formed in a second direction, the second mesh patterns including isolated unit patterns; a bridge electrode connecting the neighboring unit patterns of the second mesh patterns; an insulation layer disposed between the sensing pattern and the bridge electrode; and an auxiliary electrode layer on an at least one of the first mesh pattern and the second mesh pattern, the auxiliary electrode layer being connected to at least one of the first mesh pattern and the second mesh pattern.

(2) The touch sensor according to the above (1), wherein the sensing pattern includes at least one selected from the consisting of molybdenum, silver, aluminum, copper, palladium, gold, platinum, zinc, tin, titanium, chromium, nickel, tungsten, an alloy thereof, indium-tin oxide (ITO), indium-zinc oxide (IZO), zinc oxide (ZnO), indium-zinc-tin oxide (IZTO), cadmium-tin oxide (CTO), copper oxide (CO), poly(3,4-ethylenedioxythiophene) (PEDOT), carbon nanotube (CNT), and graphene.

(3) The touch sensor according to the above (1), wherein the first and second mesh patterns have a width of 1 to 30 μm.

(4) The touch sensor according to the above (1), wherein the bridge electrode includes at least one selected from the group consisting of molybdenum, silver, aluminum, copper, palladium, gold, platinum, zinc, tin, titanium, chromium, nickel, tungsten, an alloy thereof, indium-tin oxide (ITO), indium-zinc oxide (IZO), zinc oxide (ZnO), indium-zinc-tin oxide (IZTO), cadmium-tin oxide (CTO), copper oxide (CO), poly(3,4-ethylenedioxythiephene) (PEDOT), carbon nanotube (CNT), and graphene.

(5) The touch sensor according to the above (1), wherein the auxiliary electrode layer has a thickness of 5 to 350 nm.

(6) The touch sensor according to the above (1), wherein the auxiliary electrode layer has an opening therein.

(7) The touch sensor according to the above (6), wherein the opening is formed in a region in which the sensing pattern is not present on a lower side thereof.

(8) The touch sensor according to the above (1), wherein the auxiliary electrode layer is formed of the same material as that of the bridge electrode in a single process.

(9) The touch sensor according to the above (1), wherein the auxiliary electrode layer formed on the second mesh pattern and connected to the second mesh pattern is connected with the bridge electrode.

(10) The touch sensor according to the above (1), wherein the insulation layer has a continuous layer shape, and the auxiliary electrode layer is connected with the sensing pattern through a contact hole formed in the insulation layer.

(11) The touch sensor according to the above (1), wherein the insulation layer has an island shape at an intersection region of the sensing pattern and the bridge electrode, and the auxiliary electrode layer covers the sensing patterns.

(12) A touch sensor comprising: a substrate; sensing patterns which include first mesh patterns formed on the substrate in a first direction and second mesh patterns formed on the substrate in a second direction, the second mesh patterns including isolated unit patterns; a bridge electrode connecting the neighboring unit patterns of the second mesh patterns; an insulation layer disposed between the sensing pattern and the bridge electrode; and an auxiliary electrode pattern enclosing at least one of the first mesh pattern and the second mesh pattern.

(13) The touch sensor according to the above (12), wherein the insulation layer has an island shape at an intersection region of the sensing pattern and the bridge electrode.

(14) The touch sensor according to the above (12), wherein the insulation layer has a continuous layer shape, and the auxiliary electrode pattern encloses at least one of the first mesh pattern and the second mesh pattern through a contact line formed in the insulation layer along at least one of the first mesh pattern and the second mesh pattern.

(15) The touch sensor according to the above (12), wherein the auxiliary electrode pattern is formed of the same material as that of the bridge electrode in a single process.

(16) The touch sensor according to the above (12), wherein the auxiliary electrode pattern has a smaller taper angle than that of the sensing pattern.

(17) The touch sensor according to the above (12), wherein the auxiliary electrode pattern enclosing the second mesh pattern is connected with the bridge electrode.

(18) The touch sensor according to the above (12), wherein the bridge electrode has a mesh structure.

(19) The touch sensor according to the above (120, wherein the bridge electrode has two or more bridges.

(20) An image display device comprising the touch sensor according to any one of the above (1) to (19).

According to the touch sensor of the present inventive concepts, even though the sensing pattern is disconnected, touch contact signals may be transferred by the auxiliary electrode layer, and thus the touch sensitivity may be remarkably improved.

Further, according to the touch sensor of the present inventive concepts, the sensing patterns may be formed in thinner thickness and/or width, and thus the sensing patterns may be prevented from being viewed by the user.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTIONS

According to an embodiment of the present inventive concepts, a touch sensor includes sensing patterns which include first mesh patterns formed in a first direction and second mesh patterns formed in a second direction; a bridge electrode configured to connect isolated unit patterns of the second mesh patterns; an insulation layer disposed between the sensing pattern and the bridge electrode; and an auxiliary electrode layer which is disposed on at least one of the first mesh pattern and the second mesh pattern, and is connected to at least one of the first mesh pattern and the second mesh pattern. In the touch sensor according to an embodiment of the present inventive concepts, even though the sensing pattern is disconnected, touch contact signals may be transferred by the auxiliary electrode layer, and thus the touch sensitivity may be remarkably improved. Further, the sensing patterns may be formed in thinner thickness and/or width, and thus the sensing patterns may be prevented from being viewed by the user.

The size and thickness of each element are arbitrarily shown in the drawings, and the present invention is not necessarily limited thereto.

In the drawings, the thickness of layers, films, panels, regions, patterns, etc., are exaggerated for clarity. Also, in the drawings, the thickness of some layers and regions are exaggerated for the sake of brevity. It will be understood that when an element such as a layer, film, region, or substrate is referred to as being "on" or "below" another element, it can be directly on the other element or intervening elements may also be present.

Hereinafter, some exemplary embodiments of the present inventive concepts will be provided with accompanying drawings. However, these embodiments are only given for illustrating the present inventive concepts, and are not to be construed as limiting the scope of the present invention.

A touch sensor of the present inventive concepts includes sensing patterns, a bridge electrode 30, an insulation layer 40 and an auxiliary electrode layer 60.

The sensing patterns may include a first mesh pattern 10 formed in a first direction and a second mesh pattern 20 formed in a second direction.

In example embodiments, a plurality of the first mesh patterns 10 and the second mesh patterns 20 may be arranged along different directions from each other. For example, the first direction may be an X-axis direction, and the second direction may be a Y-axis direction orthogonal to the first direction.

The first mesh pattern 10 and the second mesh pattern 20 may be configured to provide information on X coordinate and Y coordinate of a touched point, respectively. For example, when a user touches a point on a cover window substrate with a finger or an individual tool, information of the touched point may be detected and transferred to a driving circuit via the first mesh pattern 10, the second mesh pattern 20 and a position detecting line as a change in capacitance depending on a contact position. The change in capacitance may be converted to an electrical signal by X and Y input processing circuits (not illustrated), to identify the contact position.

In the configuration and implementation as mentioned above, the first and second mesh patterns 10 and 20 may be formed on the same layer, and the respective patterns are electrically connected with each other to detect the touched point. The first mesh patterns 10 may be connected with each other while the second mesh patterns 20 may be separated from each other in an island form. Thus, an additional bridge electrode 30 may be formed to electrically connect the second mesh patterns 20 with each other. The bridge electrode 30 will be described below.

In example embodiments, a form of the mesh structure may not be particularly limited. For example, a rectangular mesh structure, a rhombic mesh structure, a hexagonal mesh structure, or the like may be employed. In each structure, the mesh pattern may have a long side length of, for example, 2 to 500 µm, and the long side length may be appropriately adjusted within the above range in consideration of electrical conductivity, transmittance, or the like.

A width of the mesh pattern is not particularly limited and may be, for example, 1 to 30 µm, and preferably, 1 to 20 µm. When a metal mesh pattern has a width of 1 to 30 µm, visibility of patterns may be reduced while maintaining a proper electrical resistance.

A thickness of the sensing pattern is not particularly limited, for example, may be 10 to 350 nm. If the thickness of the sensing pattern is less than 10 nm, the electrical resistance may be increased to reduce touch sensitivity, and if the thickness exceeds 350 nm, a reflectivity may be increased to cause problems entailed in the visibility of patterns.

The sensing pattern may be formed of a material having excellent electric conductivity and low resistance, for example, molybdenum, silver, aluminum, copper, palladium, gold, platinum, zinc, tin, titanium, chromium, nickel, tungsten or an alloy thereof.

A transparent electrode material known in the related art may also be used for the sensing pattern. For example, indium-tin oxide (ITO), indium-zinc oxide (IZO), zinc oxide (ZnO), indium-zinc-tin oxide (IZTO), cadmium-tin oxide (CTO), copper Oxide (CO), poly(3,4-ethylenedioxythiephene) (PEDOT), carbon nanotube (CNT), graphene, etc., may be used.

The sensing pattern may be formed by, for example, various thin film deposition techniques such as a physical vapor deposition (PVD), a chemical vapor deposition (CVD), or the like. For example, the sensing pattern may be formed by a reactive sputtering which is an example of the physical vapor deposition. The sensing pattern may also be formed by a photolithography process.

The bridge electrode 30 may connect isolated unit patterns of the second mesh pattern 20. In this case, the bridge electrode 30 may be insulated from the first mesh patterns 10 of the sensing patterns, and the insulation layer 40 may be formed as described below.

Any transparent electrode material known in the related art may be used for the bridge electrode 30 without particular limitation thereof. For example, indium-tin oxide (ITO), indium-zinc oxide (IZO), zinc oxide (ZnO), indium-zinc-tin oxide (IZTO), cadmium-tin oxide (CTO), copper Oxide (CO), poly(3,4-ethylenedioxythiephene) (PEDOT), carbon nanotube (CNT), graphene, etc., may be used. These may be used alone or in a combination thereof. Preferably, the indium-tin oxide (ITO) may be used.

A metal having excellent electric conductivity and low resistance may be also used for the bridge electrode 30. For example, molybdenum, silver, aluminum, copper, palladium, gold, platinum, zinc, tin, titanium, chromium, nickel, tungsten or an alloy thereof may be used.

A size or a dimension of the bridge electrode 30 is not particularly limited. For example, a long side of the bridge electrode 30 may have a length of 2 to 500 µm, and preferably, 2 to 300 µm. When the long side of the bridge electrode 30 has a length of 2 to 500 µm, visibility of patterns may be reduced while maintaining a proper electrical resistance.

The bridge electrode 30 may have a thickness of, e.g., 5 to 350 nm. When the thickness of the bridge electrode 30 is within the above range, a reduction of flexibility and transmittance may be suppressed while improving a resistance.

The bridge electrode 30 may include a bridge having, e.g., a bar structure.

Figure 1:
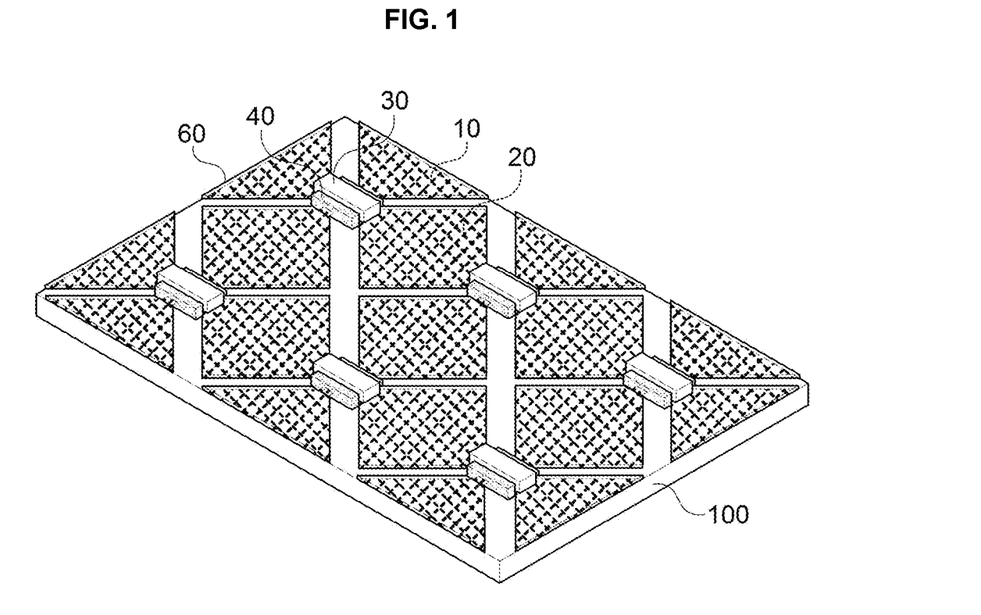
FIG. 1 is a schematic perspective view of a touch sensor according to one embodiment of the present invention.
Figure 2:
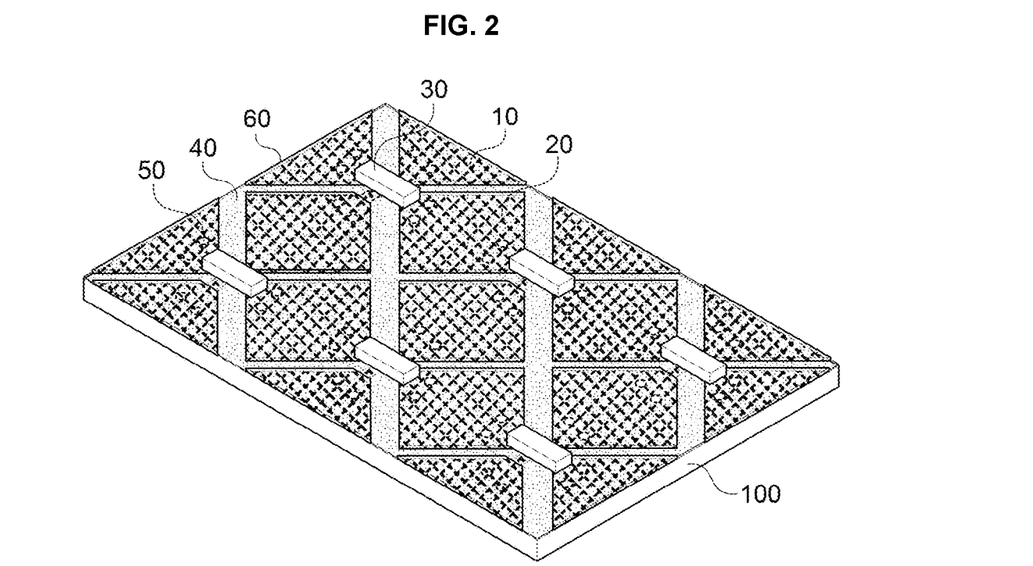
FIG. 2 is a schematic perspective view of a touch sensor according to one embodiment of the present invention.
Figure 3:
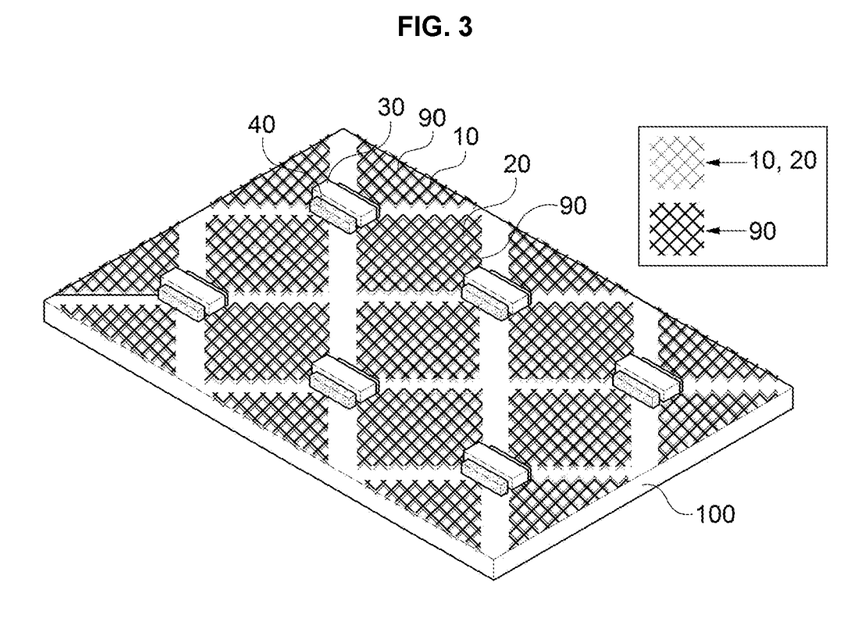
FIG. 3 is a schematic perspective view of a touch sensor according to one embodiment of the present invention.
Figure 4:
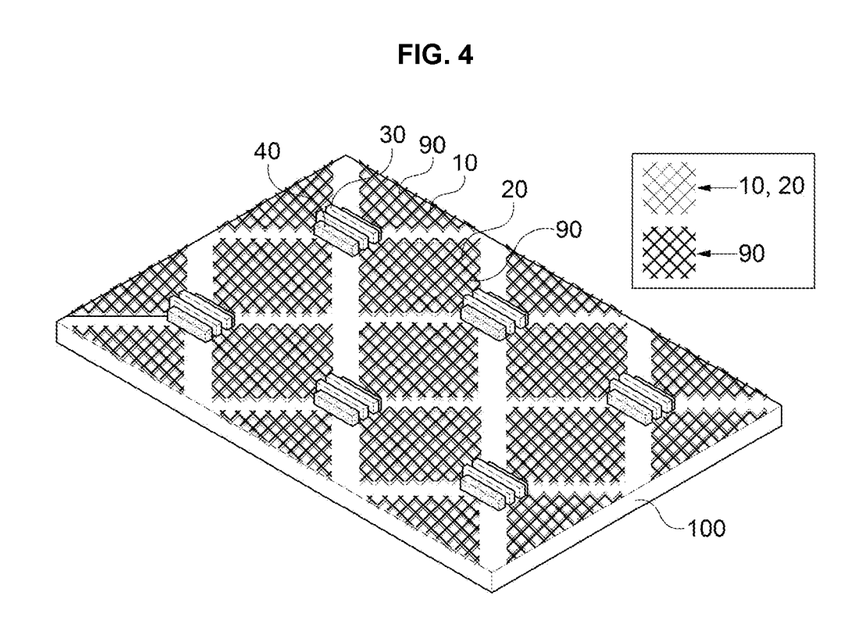
FIG. 4 is a schematic perspective view of a touch sensor according to one embodiment of the present invention.

The bridge electrode 30 may include, for example, a single bridge as illustrated in FIGS. 1 to 3, and may include two or more bridges as illustrated in FIG. 4. When the bridge electrode 30 has two or more bridges, properties relating to resistance and reliability may be further enhanced.

In an embodiment, the bridge electrode 30 may include openings (not illustrated). In this case, an area of the bridge electrode 30 may be decreased to improve flexibility of the touch sensor.

Figure 8:
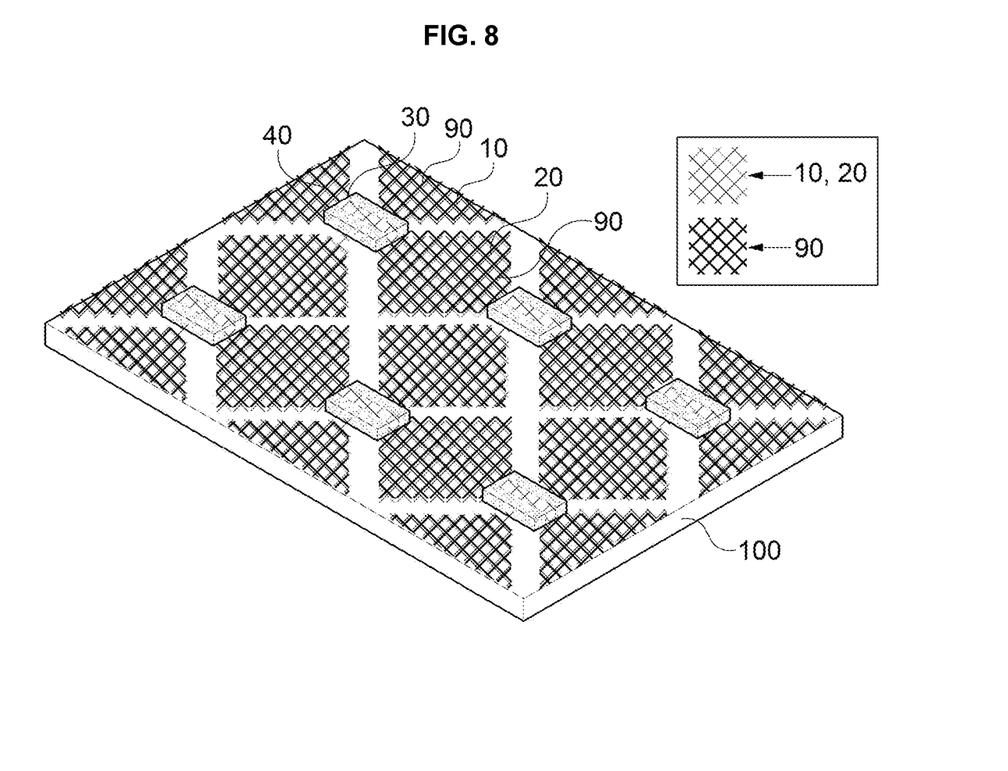
FIG. 8 is a schematic perspective view of a touch sensor according to one embodiment of the present invention.

Further, the bridge electrode 30 may have a mesh structure as illustrated in FIG. 8. In this case, the area of the bridge electrode 30 may be also decreased to improve the flexibility of the touch sensor.

For example, the bridge electrode 30 may be formed by the method of forming the sensing pattern described above.

The insulation layer 40 may be disposed between the sensing pattern and the bridge electrode 30 to insulate the first mesh pattern 10 and the second mesh pattern 20 from each other.

The insulation layer 40 may be positioned selectively at an intersection area of the sensing patterns and the bridge electrode 30 in an island form as illustrated in FIG. 1, or may be formed as a continuous layer as illustrated in FIG. 2.

If the insulation layer 40 is positioned in the island form, the second mesh pattern 20 may be directly connected with the bridge electrode 30. If the insulation layer 40 is positioned in the continuous layer form, the second mesh pattern 20 may be connected with the bridge electrode 30 through a contact hole 50 formed in the insulation layer 40.

The insulation layer 40 may be formed using a material and a method commonly used in the related art without particular limitation thereof.

The touch sensor of the present inventive concepts may further include an auxiliary electrode layer 60.

The auxiliary electrode layer 60 may be disposed on an upper side of at least one of the first mesh pattern 10 and the second mesh pattern 20, and may be connected to at least one of the first mesh pattern 10 and the second mesh pattern 20.

The auxiliary electrode layer 60 may be connected to at least one of the first mesh pattern 10 and the second mesh pattern 20. Thus, positional information of the contact point may be transferred through the auxiliary electrode layer 60 even when the mesh pattern of the sensing pattern may be disconnected, so that the touch sensitivity may be remarkably improved. Further, resistance of the sensing patterns may be reduced, and thus the sensing patterns may be formed in thinner thickness and/or width. Therefore, the sensing patterns may be prevented from being viewed by a user.

Any transparent electrode material known in the related art may be used for the auxiliary electrode layer 60 without particular limitation thereof. For example, indium-tin oxide (ITO), indium-zinc oxide (IZO), zinc oxide (ZnO), indium-zinc-tin oxide (IZTO), cadmium-tin oxide (CTO), copper oxide (CO), poly(3,4-ethylenedioxythiephene) (PEDOT), carbon nanotube (CNT), graphene, etc., may be used. These may be used alone or in a combination thereof. Preferably, indium-tin oxide (ITO) may be used. Preferably, the auxiliary electrode layer 60 is made of the same material as the bridge electrode 30. In some embodiments, the auxiliary electrode layer 60 may be simultaneously formed in a single process during forming the bridge electrode 30 to improve a process yield.

A metal having excellent electric conductivity and low resistance may be also used for the auxiliary electrode layer 60. For example, molybdenum, silver, aluminum, copper, palladium, gold, platinum, zinc, tin, titanium, chromium, nickel, tungsten or an alloy of two or more thereof may be used.

The auxiliary electrode layer 60 may have a thickness of, e.g., 5 to 350 nm. When the thickness of the auxiliary electrode layer 60 is within the above range, a proper flexibility may be obtained while reducing the resistance of the sensing patterns. The thickness of the auxiliary electrode layer 60 may be controlled so as to obtain proper resistance and flexibility.

Figure 5:
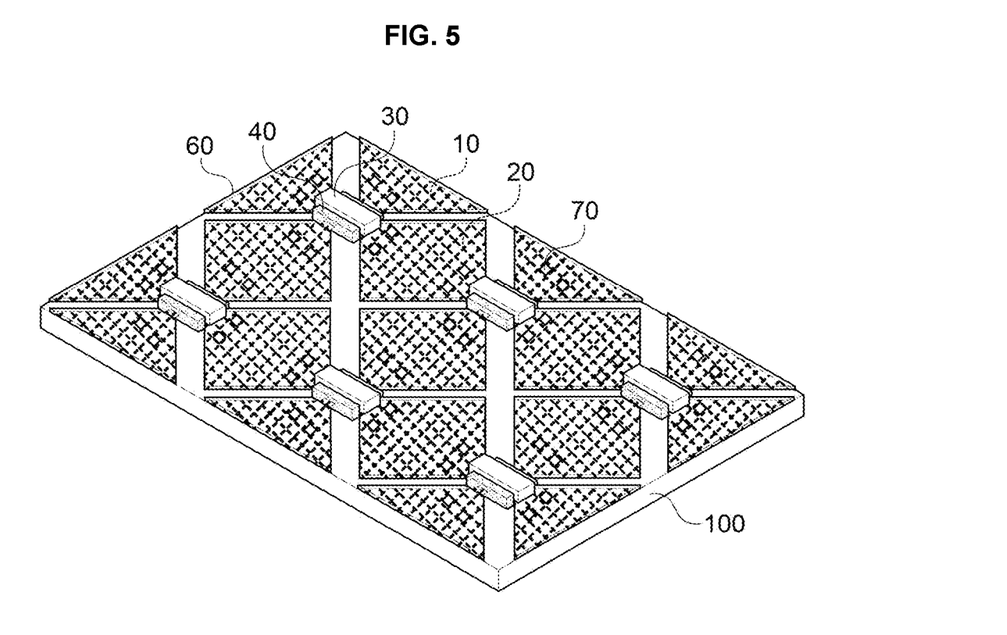
FIG. 5 is a schematic perspective view of a touch sensor according to one embodiment of the present invention.
Figure 6:
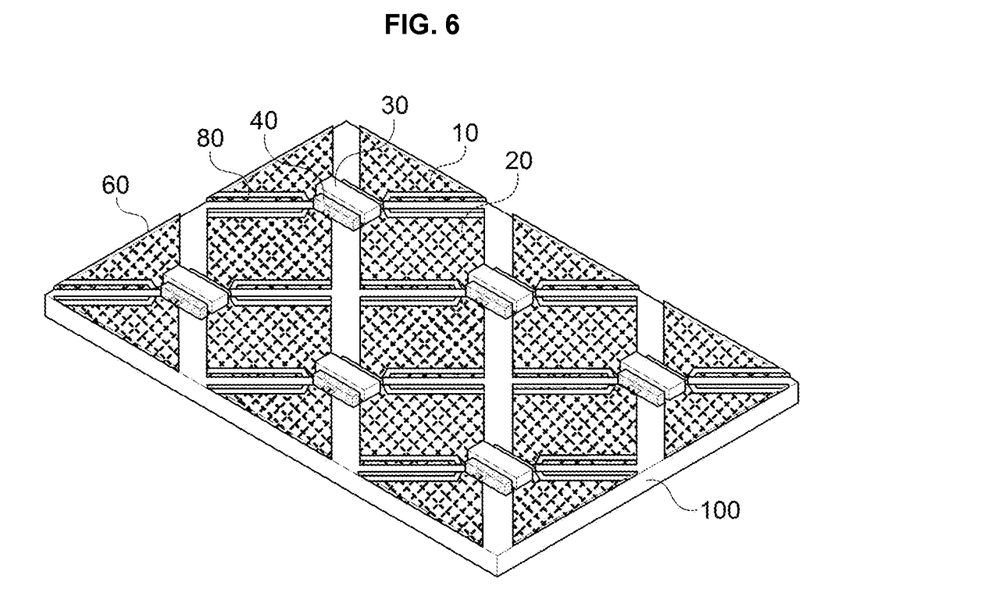
FIG. 6 is a schematic perspective view of a touch sensor according to one embodiment of the present invention.

The auxiliary electrode layer 60 may have openings 70 as illustrated in FIG. 5.

When the auxiliary electrode layer 60 has the openings 70, the transmittance and flexibility of the touch sensor may be improved.

A shape of the opening 70 is not particularly limited, and may have, for example, various shapes such as a diamond, pentagonal, hexagonal, circular, oval shape, or the like.

The openings 70 may be formed at any region of the auxiliary electrode layer 60. In example embodiments, the openings 70 may be formed at regions in which the sensing pattern is not present on a lower side thereof, from an aspect of achieving excellent transmittance, flexibility, and touch sensitivity of the touch sensor.

Additionally, the auxiliary electrode layer 60 may further include a dummy pattern 80, at least a portion of which may be separated. One or more dummy pattern 80 may be formed, and when a plurality of dummy patterns 80 are present, the respective dummy patterns 80 may be separated from each other, and may be also separated from the auxiliary electrode layer 60.

If the dummy pattern 80 is included, an area for the auxiliary electrode layer 60 may be reduced so that the transmittance and flexibility of the touch sensor may be also improved.

The auxiliary electrode layer 60 formed on the first mesh pattern 10 may be connected to the first mesh pattern 10, and the auxiliary electrode layer 60 on the second mesh pattern 20 may be connected to the second mesh pattern 20.

If the above-described insulation layer 40 has a continuous layer shape, the auxiliary electrode layer 60 may be connected with the sensing pattern through the contact hole formed in the insulation layer 40. If the insulation layer 40 has an island shape at the intersection region of the sensing pattern and the bridge electrode 30, the auxiliary electrode layer 60 may cover the sensing patterns.

The auxiliary electrode layer 60 formed on the second mesh pattern 2 and connected to the second mesh pattern 20 may be connected with the bridge electrode 30.

For example, the auxiliary electrode layer 60 may be formed by the method for forming the sensing pattern as described above.

According to one embodiment of the present invention, the auxiliary electrode layer 60 may surround or enclose at least one of the first mesh pattern 10 and the second mesh pattern 20. FIGS. 3 and 4 illustrate an exemplary case in which the auxiliary electrode layer 60 is formed in the form of an auxiliary electrode pattern 90 which enclose the first mesh pattern 10 and the second mesh pattern 20.

In this case, the touch sensitivity may be improved by a small area of the auxiliary electrode pattern 90. Further, excellent touch sensitivity, transmittance, and flexibility of the touch sensor may be also realized.

If the insulation layer 40 has a continuous layer form, the auxiliary electrode pattern 60 may surround at least one of the first mesh pattern 10 and the second mesh pattern 20 through a contact line formed in the insulation layer 40 along at least one of the first mesh pattern 10 and the second mesh pattern 20.

If the insulation layer 40 has an island shape at the intersection region of the sensing pattern and the bridge electrode 30, the auxiliary electrode layer 60 may directly surround at least one of the first mesh pattern 10 and the second mesh pattern 20.

Figure 7:
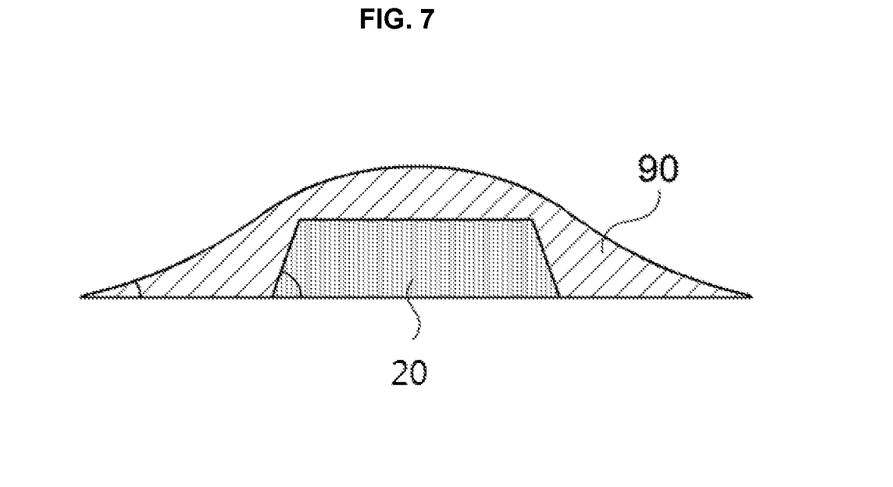
FIG. 7 is a cross-sectional view illustrating a sensing pattern and an auxiliary electrode layer included in a touch sensor according to one embodiment of the present invention.

As illustrated in FIG. 7, the auxiliary electrode pattern 90 may have a smaller taper angle than the taper angle of the sensing pattern.

The touch sensor of an embodiment of the present invention may further include a functional layer such as a transparent dielectric layer, a passivation layer, etc., as in the conventional touch sensor. Generally, a metal pattern is formed with a relatively large taper angle, and thus the functional layer may not be easily formed thereon However, the touch sensor of an embodiment of the present inventive concepts may include the auxiliary electrode patterns 90 which may surround the first mesh pattern 10 and the second mesh pattern 20, so that the taper angles of the patterns may be decreased, and thus the functional layer may be more easily coated thereon.

For example, the sensing pattern may have a taper angle of 45° to 120°, and the auxiliary electrode pattern 90 may have a taper angle of 30° to 85°, but it is not limited thereto. If a reversed taper occurs (when the taper angle exceeds 90°) in the sensing pattern, the auxiliary electrode pattern 90 may enclose the sensing pattern to decrease the taper angle.

The auxiliary electrode pattern 90 may be formed of the same material and process as those for the bridge electrode 30 simultaneously in a single process to simplify process and improve production yield.

The auxiliary electrode patterns 90 surrounding or enclosing the second mesh pattern 20 may be connected with the bridge electrode 30 to further decrease the resistance.

For example, the auxiliary electrode layer 60 may be formed by the method substantially the same as that of the sensing pattern as described above.

The touch sensor of the present inventive concepts may be disposed on a substrate 100.

The substrate may include, e.g., glass, polyethersulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), cellulose acetate propionate (CAP), or the like.

Example embodiments of the present invention may also provide an image display device including the above-described touch sensor.

The touch sensor of the present inventive concepts may be employed in a liquid crystal display device, an electro-luminescent display device, a plasma display device, an electro-luminescent emission display device, or the like.

The auxiliary electrode layer 60 may include the openings 70 or may be provided as the auxiliary electrode pattern 90. In this case, the flexibility of the touch sensor may be further improved, and the touch sensor may be efficiently applied to a flexible image display device.

While preferred embodiments have been described to more concretely understand the present, however, it will be apparent to those skilled in the related art that such embodiments are provided for illustrative purposes without limitation of appended claims, various modifications and alterations may be possible without departing from the scope and spirit of the present invention, and such modifications and alterations are duly included in the present invention as defined by the appended claims.

What is claimed is:

1. A touch sensor comprising:
   a sensing pattern comprising first mesh patterns extending in a first direction and connected to each other in a same layer and second mesh patterns formed in a second direction which is different from the first direction, the first mesh patterns comprising a plurality of first unit patterns, the second mesh patterns comprising a plurality of second unit patterns separated from each other;
   a bridge electrode connecting the neighboring second unit patterns of the second mesh patterns and insulated from the first mesh patterns;
   an insulation layer disposed between the sensing pattern and the bridge electrode; and
   an auxiliary electrode layer on an at least one of the first unit patterns and the second unit patterns, the auxiliary electrode layer connected to at least one of the first mesh patterns and the second mesh patterns,
   wherein the bridge electrode is disposed on the insulation layer to be located on a different level from the first mesh pattern;
   each of the sensing pattern, the bridge electrode and the auxiliary electrode layer is formed of at least one selected from the group consisting of molybdenum, silver, aluminum, copper, palladium, gold, platinum, zinc, tin, titanium, chromium, nickel, tungsten, an alloy thereof, indium-tin oxide (ITO), indium-zinc oxide (IZO), zinc oxide (ZnO), indium-zinc-tin oxide (IZTO), cadmium-tin oxide (CTO), and copper oxide (CO);
   the first mesh patterns and the second mesh patterns are formed on a same side of a substrate; and
   the auxiliary electrode layer has openings formed in a region in which a mesh structure of the sensing pattern are not present on a lower side thereof, the openings located in a region in which the first unit pattern and the second unit pattern are located.

2. The touch sensor according to claim 1, wherein the first and second mesh patterns have a width of 1 to 30 μm.

3. The touch sensor according to claim 1, wherein the auxiliary electrode layer has a thickness of 5 to 350 nm.

4. The touch sensor according to claim 1, wherein the auxiliary electrode layer is formed of the same material as that of the bridge electrode in a single process.

5. The touch sensor according to claim 1, wherein the auxiliary electrode layer formed on the second mesh patterns and connected to the second mesh patterns is connected with the bridge electrode.

6. The touch sensor according to claim 1, wherein the insulation layer has a continuous layer shape, and the auxiliary electrode layer is connected with the sensing pattern through a contact hole formed in the insulation layer.

7. The touch sensor according to claim 1, wherein the insulation layer has an island shape at an intersection region of the sensing pattern and the bridge electrode, and the auxiliary electrode layer covers the sensing patterns.

8. The touch sensor according to claim 1, wherein the auxiliary electrode layer includes dummy patterns separated from each other.

9. The touch sensor according to claim 1, wherein the auxiliary electrode pattern has a smaller taper angle than that of the sensing pattern.

10. The touch sensor according to claim 1, wherein the bridge electrode has a mesh structure.

11. The touch sensor according to claim 1, wherein the bridge electrode has two or more bridges.

* * * * *